US007465223B2

(12) United States Patent
Zachariassen

(10) Patent No.: US 7,465,223 B2
(45) Date of Patent: Dec. 16, 2008

(54) METHOD AND AN APPARATUS FOR SCALDING SLAUGHTERED POULTRY

(75) Inventor: Jørgen Zachariassen, Maarslet (DK)

(73) Assignee: Linco Food Systems A/S, Trige (DK)

( * ) Notice: Subject to any disclaimer, the term of this patent is extended or adjusted under 35 U.S.C. 154(b) by 0 days.

(21) Appl. No.: 10/511,732

(22) PCT Filed: Apr. 16, 2003

(86) PCT No.: PCT/DK03/00259

§ 371 (c)(1), (2), (4) Date: May 10, 2005

(87) PCT Pub. No.: WO03/088751

PCT Pub. Date: Oct. 30, 2003

(65) Prior Publication Data

US 2006/0205333 A1 Sep. 14, 2006

(30) Foreign Application Priority Data

Apr. 19, 2002 (DK) .............................. 2002 00588

(51) Int. Cl.
*A22B 5/08* (2006.01)

(52) U.S. Cl. ........................................................ 452/74

(58) Field of Classification Search ................. 7/74–77, 7/81

See application file for complete search history.

(56) References Cited

U.S. PATENT DOCUMENTS 3,703,744 A * 11/1972 Dillon ......................... 452/73
3,729,773 A * 5/1973 Dillon ........................ 426/524
3,744,088 A * 7/1973 Snowden ..................... 452/77
3,748,691 A * 7/1973 Snowden ..................... 452/77
4,196,221 A * 4/1980 Dew ........................... 426/235
4,388,811 A * 6/1983 Zebarth ......................... 62/63
4,868,950 A * 9/1989 Harben, Jr. ................... 452/77
4,944,068 A * 7/1990 Covell, III ................... 452/80
4,947,518 A * 8/1990 Covell, III ................... 452/79
4,961,248 A * 10/1990 Criscione et al. .............. 452/79
4,996,741 A * 3/1991 Covell, III ................... 452/74
5,439,694 A * 8/1995 Morris, Jr. .................. 426/511
5,485,332 A * 1/1996 Egawa et al. ............. 360/234.8
5,882,253 A * 3/1999 Mostoller ................... 452/173
5,899,802 A * 5/1999 Burnett ....................... 452/141
6,605,308 B2 * 8/2003 Shane et al. ................ 426/332
6,733,379 B2 * 5/2004 Tsang ........................ 452/173
6,749,497 B2 * 6/2004 Haley et al. ................. 452/167
6,918,825 B2 * 7/2005 Conaway ..................... 452/88

(Continued)

*Primary Examiner*—Thomas Price
(74) *Attorney, Agent, or Firm*—Antonelli, Terry, Stout & Kraus, LLP.

(57) ABSTRACT

A method and an apparatus for scalding of slaughtered poultry are described, for example chickens, hens, turkeys, ducks, or geese, prior to plucking thereof, where the birds while shackled by their feet are conveyed through a scalding chamber (2), preferably via a sluice device, in which chamber a precisely controlled heated atmosphere of humid, hot air is established by blowing in steam at the bottom of the scalding chamber, which air is recirculated and blown directly onto the poultry, and where the scalding period is determined by the length and course of the conveyor (8) and by the capacity and/or speed of the conveyor, where a scalding chamber (2) with a relatively large height is used, and where the scalding chamber conveyor (8) including its secondary nozzles (10) extends through two or more levels (stories).

3 Claims, 1 Drawing Sheet

14 11 10 2 11 6 14 14 10 12 11 10 8 4

U.S. PATENT DOCUMENTS 7,083,510 B2 * 8/2006 Caracciolo, Jr. .............. 452/81
7,189,157 B2 * 3/2007 Wichelmann ................ 452/77
7,207,879 B2 * 4/2007 Kelly et al. ................... 452/77

* cited by examiner

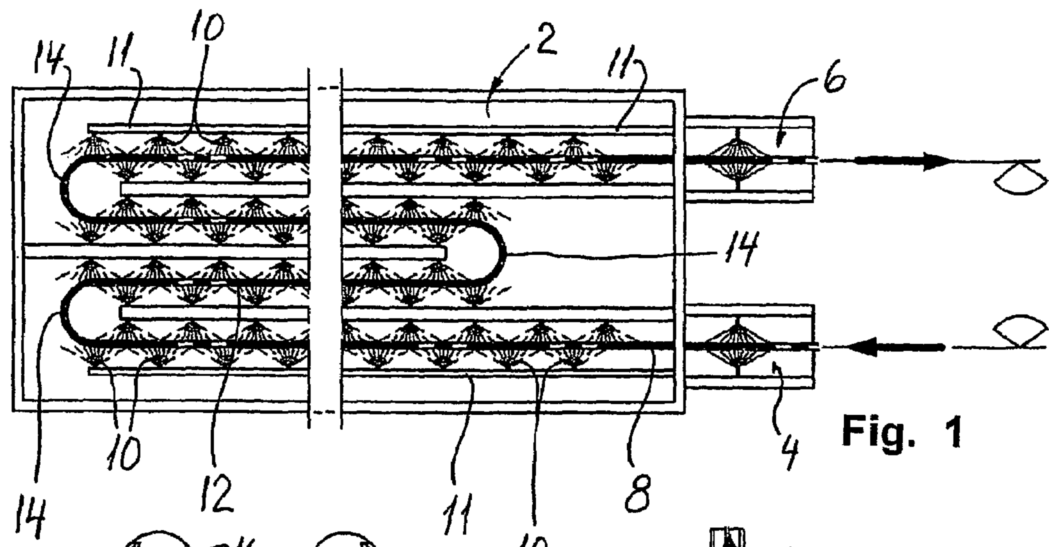
Fig. 1
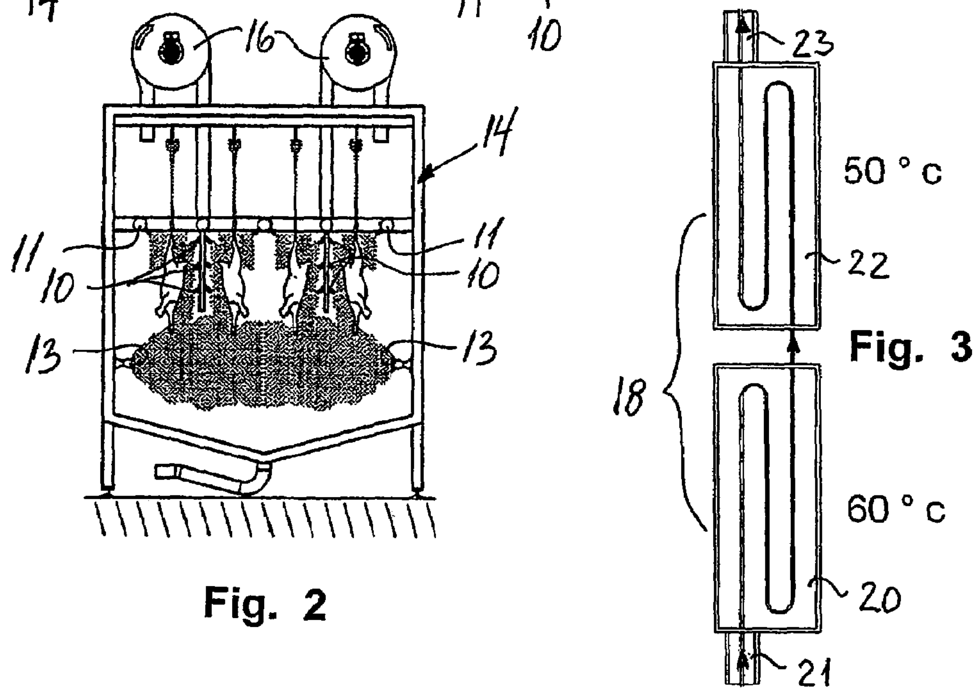
Fig. 2
Fig. 3
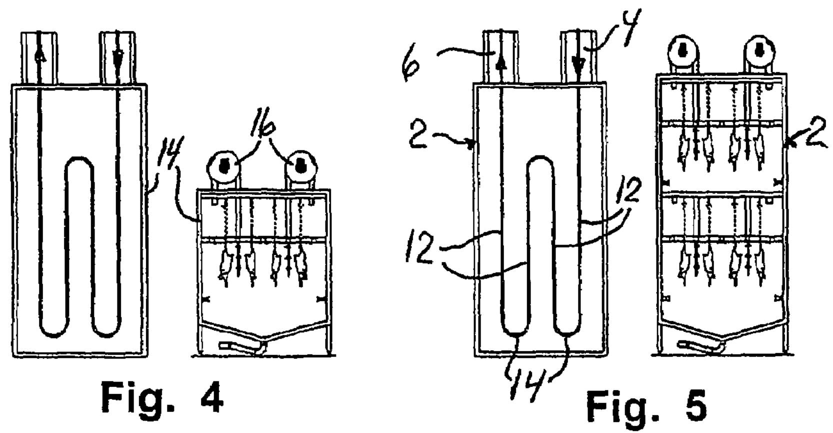
Fig. 4
Fig. 5

METHOD AND AN APPARATUS FOR SCALDING SLAUGHTERED POULTRY

BACKGROUND OF THE INVENTION

1. Field of the Invention

The present invention relates to a method for scalding of slaughtered poultry, for example chickens, hens, turkeys, ducks, or geese.

2. Description of the Prior Art

For scalding of slaughtered poultry prior to plucking, to make the feather follicles soft in order to facilitate plucking, it is known that birds shackled by their feet are successively led down through an oblong vessel containing hot water, maybe combined with the blowing in of air through nozzles placed at the bottom.

EP-A1-1 297 748 describes a method and an apparatus for scalding of poultry where saturated air is blown in at the bottom of the scalding chamber by means of a primary nozzle arrangement, which saturated steam is used for producing moist, hot air, which is sucked out at the top of the scalding chamber and reblown directly onto the poultry by means of a secondary nozzle arrangement. Although saturated steam is used for heating up the scalding air, it is nevertheless possible with this method to work with a low scalding temperature of approximately 50° C. or with a higher scalding temperature of approximately 60° C., in that the poultry is not directly exposed to saturated steam at any time.

The advantage of applying humid, hot air is a considerable energy saving and reduced spreading of bacteria. Furthermore a better working climate in the surrounding plucking room is achieved because of considerably reduced steam generation. The poultry must be in the scalding chamber for a specified period of time which is determined by the length and the course of the conveyor belt in the scalding chamber, and the capacity and/or speed of the conveyor belt. In order to utilize the space in the scalding chamber in an optimum way, the conveyor belt extends forwards and backwards in parallel lengths inside the scalding chamber at the same level.

SUMMARY OF THE INVENTION

The invention is an improved method for scalding of slaughtered poultry, and which in a simple way makes it possible to increase the scalding capacity of a given scalding system or apparatus considerably.

The method according to the invention utilizes a scalding chamber with a relatively large height with a scalding chamber conveyor, including nozzles, extending through two or more levels (stories). In a simple way it hereby becomes possible to increase the scalding capacity of a given scalding system or scalding apparatus considerably. Most often restrictions are with regard to space, that is, it is not possible to increase the scalding capacity right away just by increasing the width or the length of the scalding chamber.

In such a case, it is very important that the scalding capacity can be increased within the space given by using a scalding chamber with conveyors and nozzles at two or more levels (stories), in that scalding/plucking rooms normally have a sufficient ceiling height that allows for a relatively high scalding chamber being provided with conveyor including its nozzles at several levels (stories). A scalding principle of a closed scalding chamber with steam-saturated atmosphere is used in preference to the well-known scalding principle of a heated water bath into which the poultry is immersed, which increases the scalding capacity by using a higher, closed room with steam-saturated atmosphere.

Since the scalding chamber primarily is a closed chamber, which can be built of isolated panels, a scalding chamber according to the invention is placed externally in the form of an additional building to an existing poultry slaughterhouse, so that the scalding chamber does not take up space in the scalding/plucking room. Such an external scalding chamber can be provided with entry and exit sluices built into the wall of the usual scalding/plucking room.

Furthermore, the use of a high internal or external scalding chamber makes it possible to use the conveyor of the scalding chamber for conveying the poultry between two stories of a given slaughterhouse building in which for example a reception and slaughtering line is placed at a lower floor, and where for example a plucking line is placed at an upper floor, or vice versa.

In order to optimize the scalding of the poultry, it may be especially suitable that the method according to the invention is modified in such a way that two or more scalding chambers with mutually different temperature zones are used.

The method according to the invention may be further modified so that a short first zone having an extra high temperature is used, for example in the range of approximately 85° C. so that an efficient anti-bacterial treatment of the poultry can be achieved.

For scalding of poultry, so-called low-temperature scalding or high-temperature scalding is used, the scalding temperature in low-temperature scalding being approximately 50° C., and the scalding temperature in high-temperature scalding being approximately 60° C. For example, normally low-temperature scalding is used for poultry sold as fresh food, and where it is important that the outer skin is as intact as possible; while normally high-temperature scalding is used for poultry sold as frozen products, and in which case it is less important whether the outer skin is intact or not.

By using scalding apparatuses or systems with several temperature zones, for example a first zone having a scalding temperature of approximately 60° C., and a second zone having a scalding temperature of approximately 50° C., not only increased capacity is achieved, but also a milder scalding effect in the second zone is achieved, so that the outermost skin layer of the poultry is at all times treated as carefully as possible. It is furthermore important that scalding is optimized in such a way that lower skin and meat are not too strongly exposed to heat.

The invention furthermore relates to an apparatus for use when applying the method according to the invention, the apparatus comprising a scalding chamber with a conveyor having a course with a number of preferably mutually parallel lengths, and comprising entry and exit sluices, which conveyor extends past a system of secondary nozzles for blowing humid, hot air directly on poultry passing the secondary nozzles on the conveyor, which apparatus comprises a system of primary nozzles for blowing in steam at the bottom of the scalding chamber for producing an atmosphere of humid hot air, which air is recirculated via the secondary nozzles, which apparatus has a scalding chamber with substantial height, and the scalding chamber conveyor, including the secondary nozzles, extend through two or more levels (stories), and that the entry and exit sluices preferably are placed at different levels (stories).

In order to make it possible to optimize scalding, the apparatus according to the invention may suitably be provided with several scalding chambers each having its own temperature zone, for example a first scalding chamber with a scalding temperature of approximately 60° C., and a second scalding chamber with a scalding temperature of approximately 50° C.

In order to be able to achieve an efficient anti-bacterial treatment of the poultry, the apparatus according to the invention may furthermore be provided with a short first zone having a higher scalding temperature of approximately 85° C.

In order to make it possible to utilize an existing scalding/plucking room in the best possible way, the apparatus according to the invention may be designed in such a way, that the scalding chamber is placed externally, preferably as an additional building to an existing slaughterhouse, and that the entry and exit sluices preferably are built into an outer wall of the slaughterhouse.

The apparatus according to the invention may furthermore advantageously be designed in such a way that the scalding chamber extends between two stories of a slaughterhouse building. Thus the conveyor of the scalding chamber can be used for conveyance of the chickens between two stories of a slaughterhouse.

BRIEF DESCRIPTION OF THE DRAWINGS

The invention is described in more detail below in connection with the drawing in which FIG. 1 shows a schematic outline of a longitudinal section of an embodiment of a scalding chamber according to the invention;

FIG. 2 shows a cross-sectional view of a known scalding chamber with one level (story);

FIG. 3 shows a sectional view for illustration of a scalding chamber system having several temperature zones;

FIG. 4 shows a longitudinal sectional view and a cross-sectional view respectively of a known scalding chamber with one level (story); and FIG. 5 shows a longitudinal sectional view and a cross-sectional view respectively of an embodiment of a scalding chamber according to the invention with two levels (stories).

The scalding chamber 2 shown in FIG. 1 may for example have a width of approximately 2.5 in and a length of approximately 16 m which corresponds to a capacity of for example 3000 turkeys per hour with a shackle distance of 12 inches and a scalding period of 4 minutes. The scalding chamber 2 has an entry sluice 4 and an exit sluice 6. In order to achieve optimum utilization of the space in the scalding chamber 2, a conveyor 8, which comprises a system of secondary nozzles 10 on nozzle pipe 11, extends through this scalding chamber in mutually parallel lengths 12 with narrow turning curves 14 between the lengths 12.

FIG. 2 shows the arrangement of a scalding chamber 14 known per se, just as it shows the secondary nozzles 10. The figure also shows how the humid hot air, produced by blowing in steam through lower, primary nozzles 13 is recirculated by means of fans 16 placed on top of the scalding chamber 14, and which fans supply humid hot air to the secondary nozzles 10 via the nozzle pipes 11, which air is blown directly onto the poultry.

FIG. 3 shows how a scalding system 18 may comprise several separate scalding chambers 20 and 22 each having its own temperature zone, in that a first scalding chamber 20 having an entry sluice 21 works with steam-saturated air at approximately 60° C., while a second scalding chamber 22 having an exit sluice 23 works with steam-saturated air at approximately 50° C. Both scalding chambers 20 and 22 can be constituted by high scalding chambers according to the invention, that is, with several levels (stories).

FIG. 4 shows a longitudinal sectional view and a cross-sectional view respectively of a known scalding chamber with one level (story), while FIG. 5 shows a longitudinal sectional view and a cross-sectional view respectively of an embodiment of a scalding chamber 2 according to the invention, that is, with two levels (stories), arranged tiered, that is, one above another as shown in the cross-sectional view of FIG. 5, each level being provided with secondary nozzles 10 and primary nozzles 13, cf. the nozzle arrangement known per se, shown in FIG. 2.

The invention claimed is:

1. An apparatus comprising at least one scalding chamber, a conveyor for conveying poultry in one of the at least one scalding chamber having a course with parallel lengths including entry and exit sluices, the conveyor extending past second nozzles for blowing humid, hot air directly on the poultry passing the second nozzles on the conveyor, first nozzles for blowing in steam at a bottom of the one of the at least one scalding chamber for producing the humid, hot air which air is recirculated via the second nozzles, and wherein the conveyor in the one of the at least one scalding chamber extends through at least two tiered conveyor levels therein past the second nozzles.

2. An apparatus according to claim 1 wherein the entry and exit sluices are placed at different levels of the one of the at least one scalding chamber.

3. An apparatus according to claim 2, comprising scalding chambers each having a temperature zone, with a first scalding chamber for providing a scalding temperature of approximately 60° C., and a second scalding chamber for providing a scalding temperature of approximately 50° C.

* * * * *